UNITED STATES PATENT OFFICE.

EDMUND HENRY STOEBER, OF MADISON, WISCONSIN.

CORN-PLANTING MACHINE.

1,145,714.      Specification of Letters Patent.      Patented July 6, 1915.

Application filed March 13, 1914. Serial No. 824,585.

*To all whom it may concern:*

Be it known that I, EDMUND HENRY STOEBER, a citizen of the United States of America, residing at Madison, in the county of Dane and State of Wisconsin, have invented certain new and useful Improvements in Corn-Planting Machines, of which the following is a specification.

Figure 2:
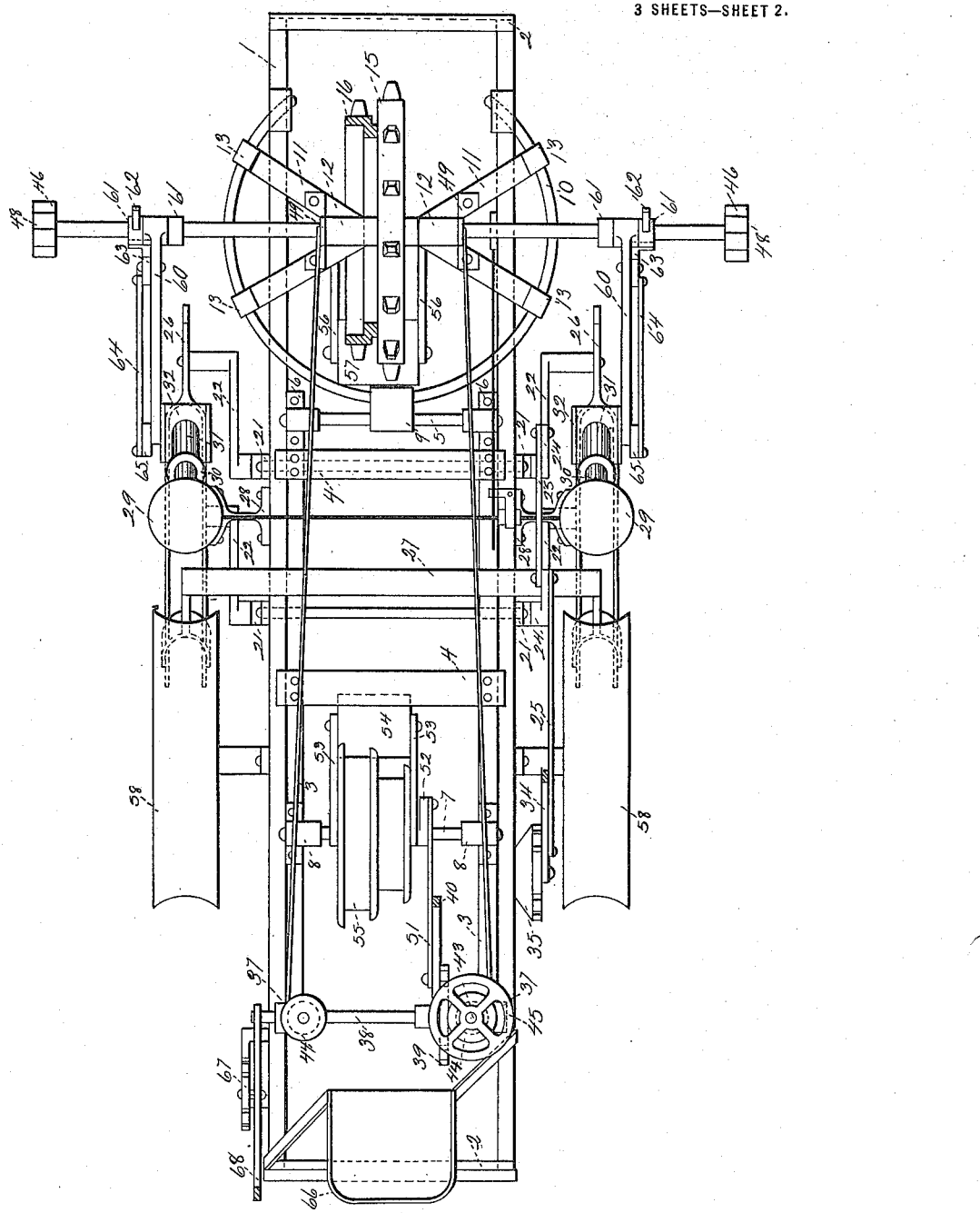

My invention relates to corn planting machines, in which the corn is automatically deposited in the ground in rows parallel to each other and spaced in said rows in such manner as to allow of cultivating both ways between the rows; and the objects of my invention are, first, to construct a marking device that will plainly mark on the field the spacing or position of the hills in the longitudinal rows; second, to have the marker and dropping arrangement so connected that the mark on the ground and the depositing of the seed will be simultaneous; third, to convey motion to the marker and coöperating parts by means of a traction chain carried by a sprocket wheel and idlers and adapted to be held in contact with the ground or raised at will for turning the machine; fourth, to raise or lower the shoes by means of arms pivotally connected to the main frame and operated by a hand lever in connection with a quadrant; fifth, to correct any variation in the spacing and dropping at any time while the machine is in motion; and, sixth to provide for angularity on hills or irregular ground by swinging the marker shaft across the machine reference being had to Fig. 2.

I attain the above objects by the mechanism illustrated in the accompanying drawing in which—

Figure 1:
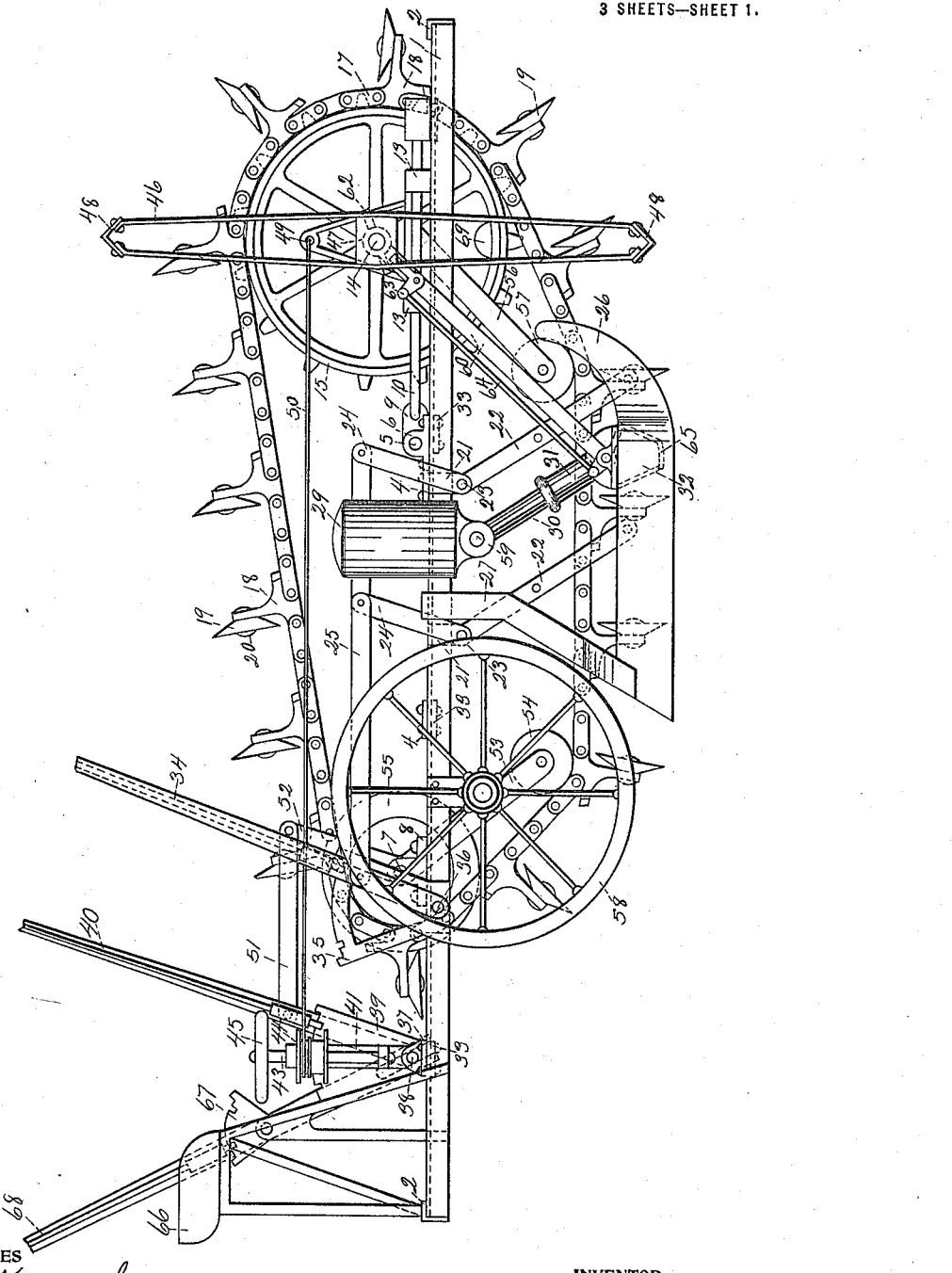
Figure 3:
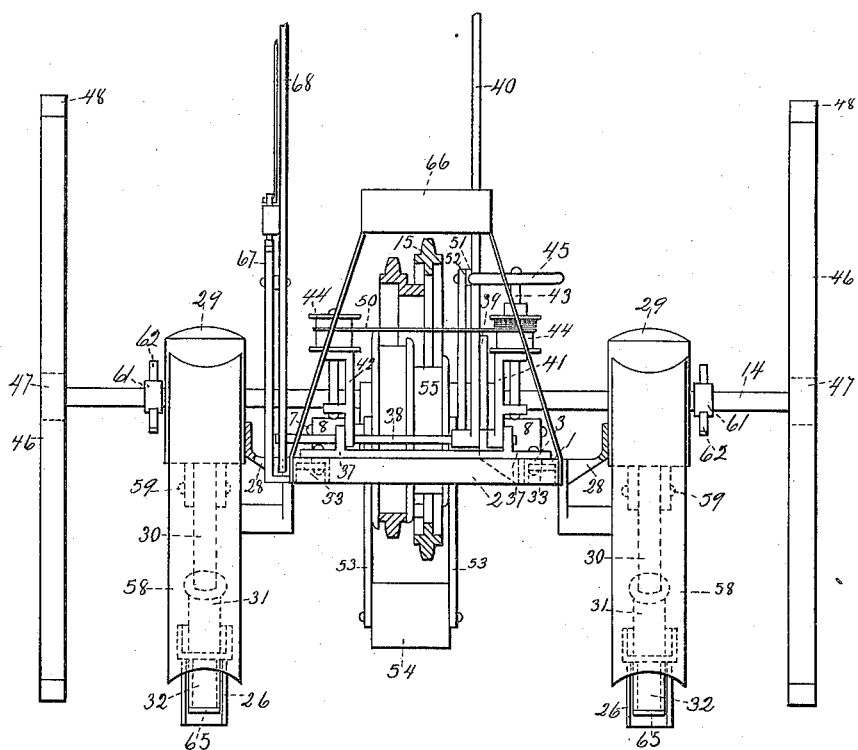

Figure 1, is a side elevation of my complete machine, Fig. 2, a plan, parts being removed, and Fig. 3, a rear elevation.

Similar numerals refer to similar parts throughout the several views.

The main frame composed of side rails 1, and end rails 2, of angle iron, mounted on two ordinary corn planter wheels constitute the carrying part of my machine. Within the main frame is a second frame of steel, comprising side rails 3, and top plates 4, said plates being bolted across the top of the rails 3, and extending a distance over the rails 1, of the main frame. The vertical leg of the first frame being on the outside and the corresponding leg of the second frame being on the inside, the horizontal legs of the two frames being contiguous by means of the two plates 4, and guide plates 33, bolted beneath the same to rails 3, and extending under rails 1, a frame within a frame is obtained, flush on the upper surface and in operative sliding contact with each other.

To the outside of the rails 1, of the main frame near their longitudinal center are secured the brackets 21. Loosely disposed within the brackets and passing from side to side of the frame are the shafts 23. Upon the shafts 23, adjacent the ends thereof are secured the arms 22, extending forward and downward to shoes 26, and pivotally attached to the same. The shoes 26, are similar and in function the same as usually employed on corn planting machines except that the rear end parallel plates are much longer in proportion for the purpose of allowing the lower end of the dropper spout 32, to be moved forward and back between the said parallel plates. To the rear end of the shoes are secured the supporting yoke 27, which holds the plates in alinement and assists the arms 22, in providing sufficient support to the shoes 26, when passing along the ground. The short levers 24, are rigidly attached to the shafts 23, on the right hand side of the machine, outside and contiguous the arms 22. The upper ends of said levers are connected to hand lever 34, by the rod 25, said lever 34, being fulcrumed to the quadrant 35, by the pin 36, and secured in the desired position by a latch and bolt in the usual manner. The shoes 26, are therefore raised and lowered by the hand lever being moved forward or back by the operator.

On top and at the back end of the rails 3, are disposed the boxes 37. Passing through the boxes and extending beyond the one on the left side of the machine is the shaft 38. Adjacent one end of the shaft and loosely disposed around the same is the quadrant 39, which is securely bolted to the inside of the rail 3. Outside of the boxes 37, on the shaft 38, are the vertical posts 41 and 42, secured to said shaft and in alinement with each other. Said posts are upright plates with outwardly projecting lugs, one at the top and one a distance above the bottom forming bearings for the upright shafts 43, upon which are disposed spools 44. The shaft 43, in the right hand post 41, extending upward far enough to receive the hand wheel 45, but the shaft in post 42, terminates at the top of the bearing above the spool. To the extreme front end of the rails are secured the bearings 6, carrying the shaft 5, to the center of which is secured clamp 9, which is connected in a rigid manner to the circular bar or fifth wheel 10, said bar 10, having disposed thereon in sliding contact through the bosses 13, the outer ends of the yokes 11. The said yoke arms converging and terminating in central hubs 12. Through the central hubs 12, which are in horizontal alinement passes marker shaft 14, at the extreme outer ends of which are secured markers 46, comprising two side rails capped at their ends by angle plates 48, and secured at the center to the hub 47. On top of the yokes 11, approximately over the main frame are the brackets 49, to which are attached the cable 50. Said cable extending backward to the spools 44, and passing several times around the one on post 41, thence across the machine to post 42, and passing the spool on said post and forward to the left hand bracket 49, thereby forming a connection whereby the said shaft 14, can be set at the desired angle across the machine, compensating for irregular surfaces of fields such as hills, valleys, etc. It is obvious that a turn of the hand wheel 45, will produce the desired result.

Inside of the quadrant 39, on shaft 38, is secured the hand lever 40, which by means of a latch is held in the desired position by quadrant 39. It is obvious that lever 40, and posts 41 and 42, being secured to the same, shaft 38 will move simultaneously. To the said lever 40, a distance upward from the fulcrum is pivotally attached the connecting rod 51, which passing forward is operatively connected to the lever 52, which is secured to shaft 7. Secured to said shaft 7, each side of the idlers 55, are arms 53, which pass forward and downward carrying at their lower ends the idler 54, which engages the chain 17, holding it taut and in the desired position. Downward and backward from the yokes 11, pass the arms 56, one each side of the sprocket wheel 15, the said arms adapted to carry the idler 57, in contact with the chain 17, aforesaid. On marker shaft 14, at its longitudinal center between the hubs 12, is secured sprocket wheel 15, which in circumference is equal to twice the distance between the hills of corn. To the side of said wheel and bolted to the arms thereof, is a second sprocket wheel 16, smaller than the first for the purpose of dropping the corn in hills a less distance apart. Mounted on sprocket wheel 15, for general use, is an endless sprocket chain 17, comprising bar links, on each side of a spacer link and the links secured together by bolts or rivets. Every fourth bar link 18, is provided with an outwardly extending post of approximately the same thickness as the link, and to the outer end of said posts are revolubly attached concave steel disks 19. Said disks adapted to revolve on pin 20, in a plane at right angles to the travel of the chain. The disks being thus arranged will permit the chain to follow a comparatively straight line on the ground in case the disks should encounter obstacles on the field. The chain being anchored temporarily to the ground by the disks 19, it is obvious that the sprocket wheel 15, will be caused to revolve by the forward motion of the machine inasmuch as the chain passes downward from the sprocket wheel 15, then under the idler 57, and backward under the idler 54, then upward over idler 55, it will be guided and given the desired tension. On top of the rails 3, adjacent the rear ends are disposed bearings 8, within which is journaled the shaft 7. Revolubly mounted on shaft 7, is the idler 55, adapted to carry the rear end of the traction chain 17, and hold same in alinement with the sprocket wheels 15 and 16. To the outside of the rails 1, of the main frame and forward of the planter wheels 58, are disposed brackets 28, to which are secured the two corn boxes 29, in vertical alinement with the center of the shoes 26. Under the dropping plates in said corn boxes which are of the usual rotary type, the bottom being of hopper form and terminating in the joint 59, to which is attached the upper section 30, which telescopes the lower section 31, of the corn spout which is pivotally connected to sliding drop casing 32. The said casing 32, comprises a top plate slidably disposed on top of the shoe 26, and connected by the rod 60, to the marker shaft 14, thereby maintaining the proper distance between the mark on the ground and the depositing of the seed. The said rod 60, is revolubly disposed on the marker shaft on the sides of the machine and held in operative position by collars 61. On the outer pair of collars 61, are radial pins 62, adapted to engage the long arm on bell crank 63, twice to each revolution of the marker shaft 14, thereby through the connecting rod 64, attached to the swinging bottom plate 65, drop two hills of corn to each revolution of the sprocket wheel 15, and marker shaft aforesaid. On the left side of the seat to the outside of the rail 1, is secured quadrant 67. Pivotally connected to said quadrant is hand lever 68, which is bifurcated at the lower end spanning and operatively engaging shaft 38. The said lever being secured to the quadrant by latch and bolt in the usual manner. It is therefore obvious that the operator by moving the lever 68, forward or backward can correct any irregularities in the dropping while the machine is in motion inasmuch as the entire dropping and marking mechanism is either upon or connected to the inner sliding frame and moves simultaneously with the bottom of the lever 68.

To operate my machine, throw lever 40, back to extreme position raising the chain 17, a distance above the ground, when the weight 69, in the sprocket wheel 15, will cause the marker shaft to move until the marker caps 48, are in practically vertical alinement with each other and the one nearest the ground approximately one half space in advance of the desired location for the first hill. Then with the lever 68, move the inner frame forward or back as desired and adjust as on a side hill by the hand wheel 45. In subsequent rows adjust as above explained. Lever 40, is secured to shaft 38. Shaft 38, is journaled in bearings 37, which are secured to the frame 3. Shaft 38, therefore is a pivotal point for lever 40. Secured to the said shaft 38, are two posts 41 and 42, and at the extreme front of the frame 3, are journal bearings 6, rigidly secured to the said frame. Journaled in said bearings 6, is shaft 5, a second pivot point. To this shaft 5, by means of the clamp 9, is rigidly secured, the circular bar 10. The yokes 11, are disposed on bar 10, and move upward therewith. In the yokes 11, is journaled the shaft 14, and upon said shaft is mounted the sprocket wheel 15. Around the sprocket wheel 15, is disposed the chain 17. Brackets 49, which are rigidly secured to the top of the yokes 11, when forced to the left, Fig. 1, will cause the sprocket wheel carrying the front end of the chain to raise from the pivot point or shaft 5, and the cable 50, which connects the brackets 49, to the posts 41, and 42, will raise the chain from the ground when the lever 40, is moved to the left, see Fig. 1. The idlers 54, on the arms 53, will also be raised when the lever 40, is thrown back by the arms 53, being attached to the shaft 7, and through the arm 52, and connection 51, attached to the lever 40. The idler 57, at the end of arm 56, is raised with the chain 17, by the arms 56, being secured to the under side of the yokes 11. The arms 53, being connected to lever 40, by arm 52, and connection 51, will raise simultaneously with idler 54, and 57 when said lever 40, is thrown back.

I am aware that numerous attempts have been made to check corn by means of chains, etc. in contact with the ground but I am not aware of any arrangement being used whereby the dropping mechanism can be moved to correct errors caused by the chain creeping or of any means to set the dropping machinery at an angle across the machine.

I therefore claim as new and my own the following:—

1. In a corn planting machine, a metal frame mounted upon wheels, and adapted to be propelled by any suitable means, a second metal frame slidably disposed within the first, two shoes with relatively long heel members, a yoke secured to the heel members connecting said shoes, a pair of upwardly extending arms hingedly attached to said shoes, said arms secured at their upper ends to shafts, two shafts journaled in brackets depending from the outer frame, a short lever extending upward from one end of each of the shafts, a rod connecting the upper ends of the said levers, a second connecting rod attached to the upper end of one of the levers operatively connecting the same to a hand lever, a hand lever, disposed on the outside of the outer frame, a quadrant secured to the outside of the outer frame, the hand lever adapted to be held in position by a latch engaging notches in the quadrant when the shoes are raised from the ground.

2. In a corn planting machine, a metal frame mounted upon two wheels adapted to be propelled by any suitable means, a second metal frame slidably disposed within the first, a pair of journal boxes secured to the top and rear end of the second frame, a shaft journaled in said bearings and extending a distance outside of one of the boxes, a bracket secured to one side of the main frame adjacent the rear end of same, a hand lever loosely mounted on a pin at the top of said bracket, said lever extending upward a distance and adapted to be locked in notches in a quadrant and downward from said pin to the shaft aforesaid and to which it is operatively attached, a marker shaft mounted on the second frame, a double marker mounted on said shaft at the ends thereof.

3. In a corn planting machine, a metal frame mounted on wheels and adapted to be propelled by any suitable means, a second metal frame slidably disposed within the first, a shaft journaled in bearings at the front end of the second frame, a clamping member secured to the shaft intermediate the ends thereof, a circular member secured to said clamping member, yokes disposed on said clamping member, a bracket on each of the said yokes, a cable attached to each of said brackets and extending back and around two spools, a hand wheel operatively connected to one of the spools for moving the yokes on the circular member, corn boxes disposed on the outer frame, means connecting said boxes to boxes beneath, means for dropping corn from the lower boxes, means connecting the lower boxes to the second or slidable frame as aforesaid.

In testimony whereof I affix my signature in the presence of two subscribing witnesses.

EDMUND HENRY STOEBER.

Witnesses:
IRVING E. BACKUS,
R. L'HOMMEDIEU.

Copies of this patent may be obtained for five cents each, by addressing the "Commissioner of Patents, Washington, D. C."